(12) United States Patent
Dobrick et al.

(10) Patent No.: US 8,163,868 B2
(45) Date of Patent: Apr. 24, 2012

(54) REDUCTION OF WHITENING OF POLYMER PARTS

(75) Inventors: Brett Collin Dobrick, Wilmington, DE (US); Benjamin Weaver Messmore, Wilmington, DE (US); Matthew Arthur Page, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 78 days.

(21) Appl. No.: 12/716,302

(22) Filed: Mar. 3, 2010

(65) Prior Publication Data
US 2010/0227999 A1 Sep. 9, 2010

Related U.S. Application Data

(60) Provisional application No. 61/156,951, filed on Mar. 3, 2009.

(51) Int. Cl.
*C08F 6/00* (2006.01)
*C08G 64/00* (2006.01)
(52) U.S. Cl. .................. 528/480; 524/104; 524/106
(58) Field of Classification Search .................. 524/104, 524/106; 528/480
See application file for complete search history.

(56) References Cited

U.S. PATENT DOCUMENTS

| 7,718,272 B2 * | 5/2010 | Natsuyama et al. | ........... 428/500 |
| 2002/0111404 A1 * | 8/2002 | Wood et al. | ................... 524/104 |

* cited by examiner

*Primary Examiner* — Terressa Boykin

(57) ABSTRACT

This invention relates to a process for producing non-whitening molded articles of poly(trimethylene terephthalate) (PTT) with reduced whitening by treating the articles with heat.

9 Claims, 3 Drawing Sheets

REDUCTION OF WHITENING OF POLYMER PARTS

FIELD OF THE INVENTION

This invention relates to a process for producing non-whitening molded articles of poly(trimethylene terephthalate) (PTT) with reduced whitening by treating the articles with heat.

BACKGROUND

The phenomenon of "blooming" is a common problem for polymeric materials. Incompatible materials added to polymers can migrate to the surface of the part, causing a "bloom" or "haze." These defects have a negative effect on the cosmetic appearance of the material and sometimes can impact performance of the material. In polyester technology, blooming is a well researched phenomenon in poly(ethylene terephthalate) (PET) films and fibers. In the case of PET, the bloom is not an additive, but a thermodynamic by-product of step polymerizations, generally cyclic oligomers, which exist at equilibrium during the melt polymerization process. A similar phenomenon is known to exist in melt processed poly (trimethylene terephthalate) (PTT). Molded articles of PTT exhibit an oligomer bloom during elevated temperature aging tests. There is a need for a process to reduce the blooming effect on the surface of polymeric articles.

SUMMARY OF THE INVENTION

The present invention describes a process for treating polymeric articles, comprising exposing the articles to heat for time periods between about 1 minute and 1 hour, wherein the whiteness of the articles is decreased by at least 10 percent from the original value, based on L* values. Generally, these polymeric articles are comprised of poly(trimethylene terephthalate).

BRIEF DESCRIPTION OF THE FIGURES/DRAWINGS

Figure 1A:
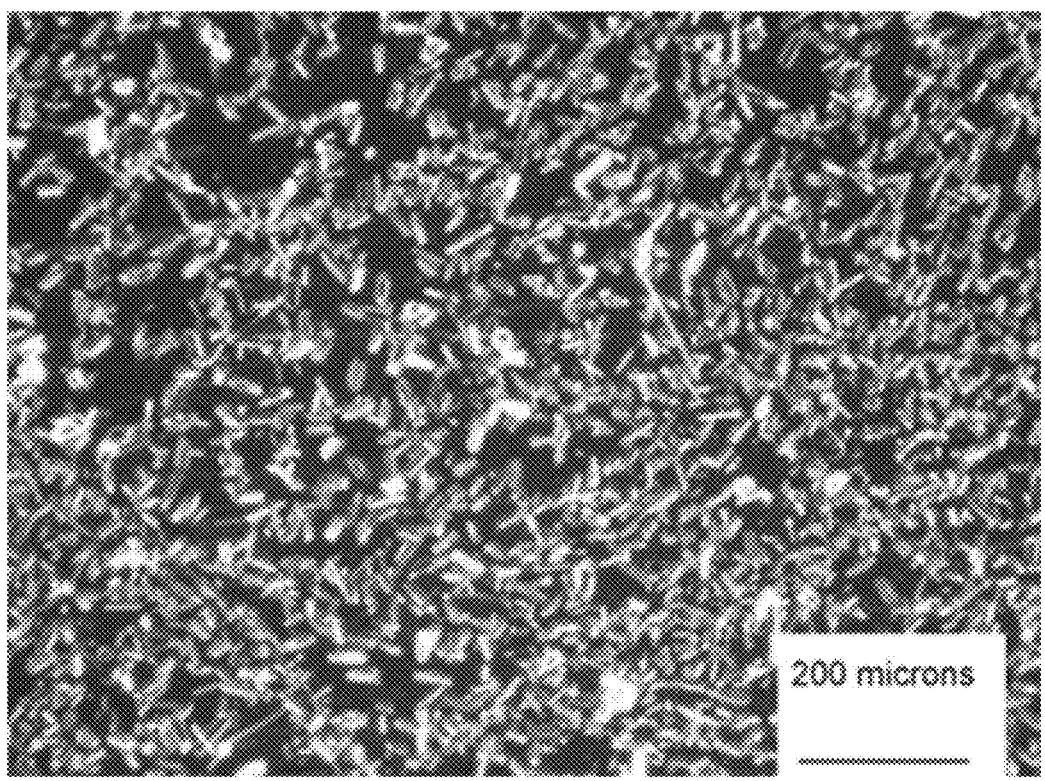
Figure 1B:
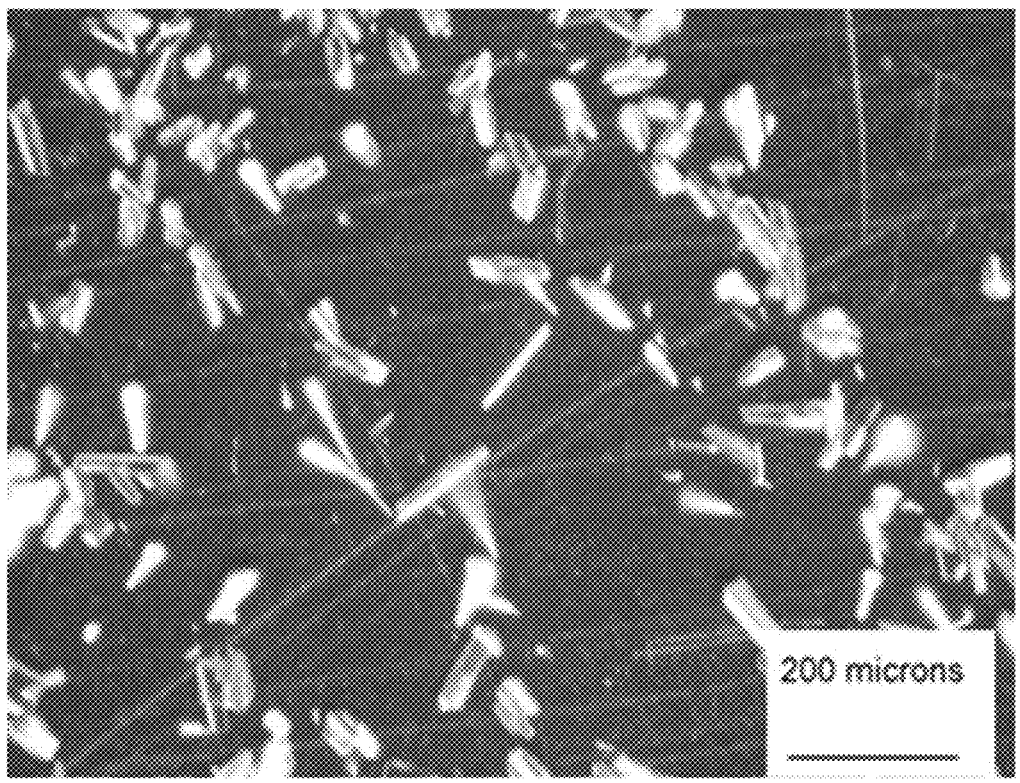
Figure 1C:
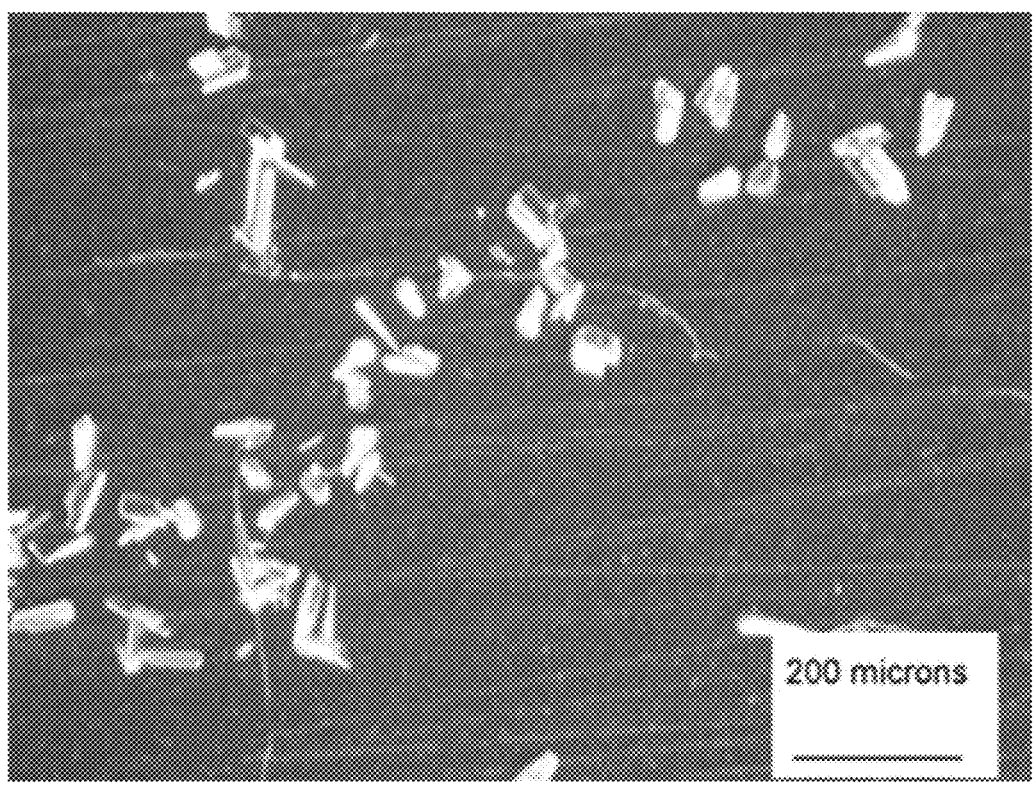

FIGS. 1A-C show optical microscopy images of three plaques subjected to different heating conditions. FIG. 1A is an image of a material at 160° C., 10 minutes; FIG. 1B is an image of a material at 180° C., 10 minutes; and FIG. 1C is an image of a material at 205° C., 10 minutes and elevated-temperature aged at 147° C. for 24 hours.

DETAILED DESCRIPTION OF THE INVENTION

Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Unless otherwise stated, all percentages, parts, ratios, etc., are by weight.

Resin Component

As indicated above, the resin component (and composition as a whole) comprises a predominant amount of a poly(trimethylene terephthalate).

Poly(trimethylene terephthalate) suitable for use in the invention are well known in the art, and conveniently prepared by polycondensation of 1,3-propane diol with terephthalic acid or terephthalic acid equivalent.

By "terephthalic acid equivalent" is meant compounds that perform substantially like terephthalic acids in reaction with polymeric glycols and diols, as would be generally recognized by a person of ordinary skill in the relevant art. Terephthalic acid equivalents for the purpose of the present invention include, for example, esters (such as dimethyl terephthalate), and ester-forming derivatives such as acid halides (e.g., acid chlorides) and anhydrides.

Preferred are terephthalic acid and terephthalic acid esters, more preferably the dimethyl ester. Methods for preparation of poly(trimethylene terephthalate) are discussed, for example in U.S. Pat. No. 6,277,947, U.S. Pat. No. 6,326,456, U.S. Pat. No. 6,657,044, U.S. Pat. No. 6,353,062, U.S. Pat. No. 6,538,076, US2003/0220465A1 and commonly owned U.S. patent application Ser. No. 11/638,919 (filed 14 Dec. 2006, entitled "Continuous Process for Producing Poly(trimethylene Terephthalate)").

The 1,3-propanediol for use in making the poly(trimethylene terephthalate) is preferably obtained biochemically from a renewable source ("biologically-derived" 1,3-propanediol).

A particularly preferred source of 1,3-propanediol is via a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in the species *Klebsiella, Citrobacter, Clostridium*, and *Lactobacillus*. The technique is disclosed in several publications, including previously incorporated U.S. Pat. No. 5,633,362, U.S. Pat. No. 5,686,276 and U.S. Pat. No. 5,821,092. U.S. Pat. No. 5,821,092 discloses, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the processes disclosed in these publications provide a rapid, inexpensive and environmentally responsible source of 1,3-propanediol monomer.

The biologically-derived 1,3-propanediol, such as produced by the processes described and referenced above, contains carbon from the atmospheric carbon dioxide incorporated by plants, which compose the feedstock for the production of the 1,3-propanediol. In this way, the biologically-derived 1,3-propanediol preferred for use in the context of the present invention contains only renewable carbon, and not fossil fuel-based or petroleum-based carbon. The polytrimethylene terephthalate based thereon utilizing the biologically-derived 1,3-propanediol, therefore, has less impact on the environment as the 1,3-propanediol used does not deplete diminishing fossil fuels and, upon degradation, releases carbon back to the atmosphere for use by plants once again. Thus, the compositions of the present invention can be characterized as more natural and having less environmental impact than similar compositions comprising petroleum based diols.

The biologically-derived 1,3-propanediol, and polytrimethylene terephthalate based thereon, may be distinguished from similar compounds produced from a petrochemical source or from fossil fuel carbon by dual carbon-isotopic finger printing. This method usefully distinguishes chemically-identical materials, and apportions carbon material by source (and possibly year) of growth of the biospheric (plant) component. The isotopes, $^{14}C$ and $^{13}C$, bring complementary information to this problem. The radiocarbon dating isotope ($^{14}C$), with its nuclear half life of 5730 years, clearly allows one to apportion specimen carbon between fossil ("dead") and biospheric ("alive") feedstocks (Currie, L. A. "Source Apportionment of Atmospheric Particles," *Characterization of Environmental Particles*, J. Buffle and H. P. van Leeuwen, Eds., 1 of Vol. I of the IUPAC Environmental Analytical Chemistry Series (Lewis Publishers, Inc) (1992) 3-74). The basic assumption in radiocarbon dating is that the constancy of $^{14}C$ concentration in the atmosphere leads to the constancy of $^{14}C$ in living organisms. When dealing with an isolated sample, the age of a sample can be deduced approximately by the relationship:

$$t=(-5730/0.693)\ln(A/A_0)$$

wherein t=age, 5730 years is the half-life of radiocarbon, and A and $A_0$ are the specific $^{14}C$ activity of the sample and of the modern standard, respectively (Hsieh, Y., *Soil Sci. Soc. Am J.*, 56, 460, (1992)). However, because of atmospheric nuclear testing since 1950 and the burning of fossil fuel since 1850, $^{14}C$ has acquired a second, geochemical time characteristic. Its concentration in atmospheric $CO_2$, and hence in the living biosphere, approximately doubled at the peak of nuclear testing, in the mid-1960s. It has since been gradually returning to the steady-state cosmogenic (atmospheric) baseline isotope rate ($^{14}C/^{12}C$) of ca. $1.2 \times 10^{-12}$, with an approximate relaxation "half-life" of 7-10 years. (This latter half-life must not be taken literally; rather, one must use the detailed atmospheric nuclear input/decay function to trace the variation of atmospheric and biospheric $^{14}C$ since the onset of the nuclear age.) It is this latter biospheric $^{14}C$ time characteristic that holds out the promise of annual dating of recent biospheric carbon. $^{14}C$ can be measured by accelerator mass spectrometry (AMS), with results given in units of "fraction of modern carbon" ($f_M$). $f_M$ is defined by National Institute of Standards and Technology (NIST) Standard Reference Materials (SRMs) 4990B and 4990C, known as oxalic acids standards HOxI and HOxII, respectively. The fundamental definition relates to 0.95 times the $^{14}C/^{12}C$ isotope ratio HOxI (referenced to AD 1950). This is roughly equivalent to decay-corrected pre-Industrial Revolution wood. For the current living biosphere (plant material), $f_M \approx 1.1$.

The stable carbon isotope ratio ($^{13}C/^{12}C$) provides a complementary route to source discrimination and apportionment. The $^{13}C/^{12}C$ ratio in a given biosourced material is a consequence of the $^{13}C/^{12}C$ ratio in atmospheric carbon dioxide at the time the carbon dioxide is fixed and also reflects the precise metabolic pathway. Regional variations also occur. Petroleum, $C_3$ plants (the broadleaf), $C_4$ plants (the grasses), and marine carbonates all show significant differences in $^{13}C/^{12}C$ and the corresponding $\delta$ $^{13}C$ values. Furthermore, lipid matter of $C_3$ and $C_4$ plants analyze differently than materials derived from the carbohydrate components of the same plants as a consequence of the metabolic pathway. Within the precision of measurement, $^{13}C$ shows large variations due to isotopic fractionation effects, the most significant of which for the instant invention is the photosynthetic mechanism. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric $CO_2$. Two large classes of vegetation are those that incorporate the "$C_3$" (or Calvin-Benson) photosynthetic cycle and those that incorporate the "$C_4$" (or Hatch-Slack) photosynthetic cycle. $C_3$ plants, such as hardwoods and conifers, are dominant in the temperate climate zones. In $C_3$ plants, the primary $CO_2$ fixation or carboxylation reaction involves the enzyme ribulose-1,5-diphosphate carboxylase and the first stable product is a 3-carbon compound. $C_4$ plants, on the other hand, include such plants as tropical grasses, corn and sugar cane. In $C_4$ plants, an additional carboxylation reaction involving another enzyme, phosphenol-pyruvate carboxylase, is the primary carboxylation reaction. The first stable carbon compound is a 4-carbon acid, which is subsequently decarboxylated. The $CO_2$ thus released is refixed by the $C_3$ cycle.

Both $C_4$ and $C_3$ plants exhibit a range of $^{13}C/^{12}C$ isotopic ratios, but typical values are ca. −10 to −14 per mil ($C_4$) and −21 to −26 per mil ($C_3$) (Weber et al., *J. Agric. Food Chem.*, 45, 2042 (1997)). Coal and petroleum fall generally in this latter range. The $^{13}C$ measurement scale was originally defined by a zero set by pee dee belemnite (PDB) limestone, where values are given in parts per thousand deviations from this material. The "$\delta^{13}C$" values are in parts per thousand (per mil), abbreviated ‰, and are calculated as follows:

$$\delta^{13}C \equiv \frac{(^{13}C/^{12}C)\text{sample} - (^{13}C/^{12}C)\text{standard}}{(^{13}C/^{12}C)\text{standard}} \times 1000\text{‰}$$

Since the PDB reference material (RM) has been exhausted, a series of alternative RMs have been developed in cooperation with the IAEA, USGS, NIST, and other selected international isotope laboratories. Notations for the per mil deviations from PDB is $\delta^{13}C$. Measurements are made on $CO_2$ by high precision stable ratio mass spectrometry (IRMS) on molecular ions of masses 44, 45 and 46.

Biologically-derived 1,3-propanediol, and compositions comprising biologically-derived 1,3-propanediol, therefore, may be completely distinguished from their petrochemical derived counterparts on the basis of $^{14}C$ ($f_M$) and dual carbon-isotopic fingerprinting, indicating new compositions of matter. The ability to distinguish these products is beneficial in tracking these materials in commerce. For example, products comprising both "new" and "old" carbon isotope profiles may be distinguished from products made only of "old" materials. Hence, the instant materials may be followed in commerce on the basis of their unique profile and for the purposes of defining competition, for determining shelf life, and especially for assessing environmental impact.

Preferably the 1,3-propanediol used as a reactant or as a component of the reactant in making poly(trimethylene terephthalate) will have a purity of greater than about 99%, and more preferably greater than about 99.9%, by weight as determined by gas chromatographic analysis. Particularly preferred are the purified 1,3-propanediols as disclosed in U.S. Pat. No. 7,038,092, U.S. Pat. No. 7,098,368, U.S. Pat. No. 7,084,311 and US20050069997A1.

The purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having a CIELAB "b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

Poly(trimethylene terephthalate)s useful in this invention can be poly(trimethylene terephthalate) homopolymers (derived substantially from 1,3-propane diol and terephthalic acid and/or equivalent) and copolymers, by themselves or in blends. Poly(trimethylene terephthalate)s used in the invention preferably contain about 70 mole % or more of repeat units derived from 1,3-propane diol and terephthalic acid (and/or an equivalent thereof, such as dimethyl terephthalate).

The poly(trimethylene terephthalate) may contain up to 30 mole % of repeat units made from other diols or diacids. The other diacids include, for example, isophthalic acid, 1,4-cyclohexane dicarboxylic acid, 2,6-naphthalene dicarboxylic acid, 1,3-cyclohexane dicarboxylic acid, succinic acid, glutaric acid, adipic acid, sebacic acid, 1,12-dodecane dioic acid, and the derivatives thereof such as the dimethyl, diethyl, or dipropyl esters of these dicarboxylic acids. The other diols include ethylene glycol, 1,4-butane diol, 1,2-propanediol, diethylene glycol, triethylene glycol, 1,3-butane diol, 1,5-pentane diol, 1,6-hexane diol, 1,2-, 1,3- and 1,4-cyclohexane dimethanol, and the longer chain diols and polyols made by the reaction product of diols or polyols with alkylene oxides.

Poly(trimethylene terephthalate) polymers useful in the present invention may also include functional monomers, for example, up to about 5 mole % of sulfonate compounds useful for imparting cationic dyeability. Specific examples of preferred sulfonate compounds include 5-lithium sulfoisophthalate, 5-sodium sulfoisophthalate, 5-potassium sulfoisophthalate, 4-sodium sulfo-2,6-naphthalenedicarboxylate, tetramethylphosphonium 3,5-dicarboxybenzene sulfonate, tetrabutylphosphonium 3,5-dicarboxybenzene sulfonate, tributyl-methylphosphonium 3,5-dicarboxybenzene sulfonate, tetrabutylphosphonium 2,6-dicarboxynaphthalene-4-sulfonate, tetramethylphosphonium 2,6-dicarboxynaphtalene-4-sulfonate, ammonium 3,5-dicarboxybenzene sulfonate, and ester derivatives thereof such as methyl, dimethyl, and the like.

More preferably, the poly(trimethylene terephthalate)s contain at least about 80 mole %, or at least about 90 mole %, or at least about 95 mole %, or at least about 99 mole %, of repeat units derived from 1,3-propane diol and terephthalic acid (or equivalent). The most preferred polymer is poly (trimethylene terephthalate) homopolymer (polymer of substantially only 1,3-propane diol and terephthalic acid or equivalent).

The resin component may contain other polymers blended with the poly(trimethylene terephthalate) such as poly(ethylene terephthalate) (PET), poly(butylene terephthalate) (PBT), poly(ethylene) (PE), poly(styrene) (PS), a nylon such nylon-6 and/or nylon-6,6, etc., and preferably contains at least about 70 wt %, or at least about 80 wt %, or at least about 90 wt %, or at least about 95 wt %, or at least about 99 wt %, poly(trimethylene terephthalate) based on the weight of the resin component. In one preferred embodiment of this patent, the polyester resin comprises 90-100 wt % of poly(trimethylene terephthalate) polyester.

Additive Package

The poly(trimethylene terephthalate)-based compositions of the present invention may contain additives such as antioxidants, residual catalyst, delusterants (such as TiO$_2$, zinc sulfide or zinc oxide), colorants (such as dyes), stabilizers, fillers (such as calcium carbonate), antimicrobial agents, antistatic agents, optical brighteners, extenders, processing aids and other functional additives, hereinafter referred to as "chip additives". When used, TiO$_2$ or similar compounds (such as zinc sulfide and zinc oxide) are used as pigments or delusterants in amounts normally used in making poly(trimethylene terephthalate) compositions, that is up to about 5 wt % or more (based on total composition weight) in making fibers and larger amounts in some other end uses.

By "pigment" reference is made to those substances commonly referred to as pigments in the art. Pigments are substances, usually in the form of a dry powder, that impart color to the polymer or article (e.g., chip or fiber). Pigments can be inorganic or organic, and can be natural or synthetic. Generally, pigments are inert (e.g., electronically neutral and do not react with the polymer) and are insoluble or relatively insoluble in the medium to which they are added, in this case the poly(trimethylene terephthalate) composition. In some instances they can be soluble.

Low concentrations of additives (0-5%) have not been found to positively impact part whitening. Part whitening has also been observed in glass or mineral (including inorganic clays) reinforced parts. The methods covered in the present disclosure can be applied to PTT parts containing these additive packages.

The poly(trimethylene terephthalate)-based compositions of the invention may be prepared by conventional blending techniques well known to those skilled in the art, e.g. compounding in a polymer extruder, melt blending, etc.

The resin component and additive(s) can be melt blended. More specifically they can be mixed and heated at a temperature sufficient to form a melt blend, and formed into shaped articles. The ingredients can be formed into a blended composition in many different ways. For instance, they can be (a) heated and mixed simultaneously, (b) pre-mixed in a separate apparatus before heating, or (c) heated and then mixed. The mixing, heating and forming can be carried out by conventional equipment designed for that purpose such as extruders, Banbury mixers or the like. The temperature should be above the melting points of each component but below the lowest decomposition temperature, and accordingly must be adjusted for any particular composition of PTT and flame retardant additive. The temperature is typically in the range of about 180° C. to about 300° C.

Poly(trimethylene terephthalate)s useful as the polyester in this invention are commercially available from E. I. DuPont de Nemours and Company of Wilmington, Del. under the trademark Sorona® and from Shell Chemicals of Houston, Tex. under the trademark Corterra®.

The present embodiments show that heat treatment of molded articles of PTT polymer containing equilibrium levels of cyclic oligomers has been found to exhibit less severe oligomer blooms during elevated-temperature aging tests. Parts placed in a convection oven from 180° C. to 225° C. for 2-30 minutes, preferably from 205° C. to 220° C. for 5-20 minutes, and most preferably from 210° C. to 215° C. for 10-15 minutes in a convection oven affords PTT molded parts that exhibit less severe blooms during elevated-temperature aging tests.

In one preferred embodiment, polyester molded parts are heated in a convection oven at a specific temperature and time with airflow over the parts.

In another preferred embodiment, polyester molded parts are heated on a conveyor belt equipped with one or several heating elements or any other radiation heating method.

In another preferred embodiment, polyester molded parts are exposed to heated air or nitrogen from any convective heating method including a tray dryer, vacuum-shelf indirect dryer, or tunnel dryer.

In another preferred embodiment, polyester molded parts are exposed to a heated conveyor belt or heated press or any other conductive heating method.

EXAMPLES

Injection molded articles of poly(trimethylene terephthalate) (PTT) were prepared by compounding PTT (Sorona® polymer) with 2.3 weight % carbon black masterbatch (52.5 weight % polyethylene carrier, 47.5 weight % carbon black) preparing a black pigmented PTT polymer and molding the polymer to afford unreinforced black parts. The black pigmented PTT polymer was extruded at 250° C. into a heated 100° C. mold, to form 3×5×⅛ inch rectangular plaques. These plaques were subjected to a bake in a convection oven at various temperatures and times as described in the examples below with an airflow of 425 cfm.

Plaques were then evaluated for blooming using an elevated-temperature blooming test. For this test, plaques were wrapped in aluminum foil and placed in aluminum pans to provide uniform heating throughout the part. The wrapped plaques in aluminum pans were placed in a closed oven (no vacuum/purge) for twenty four hours at 147° C. Part blooming can be observed over a range of temperatures. In the present examples, it was found that 147° C. for 24 hours provided good conditions to observe the oligomer bloom as it was shown to be repeatable and reproducible and gave results relatively quickly. When parts were aged at temperatures above 155° C. or greater, blooming was not repeatable due to higher rates of ring opening polymerization and sublimation of the cyclic oligomer blooms at those temperatures.

Part blooming was quantified using a DuPont Color Solutions X-Rite L*a*b* colorimeter to measure the whiteness (via L* reading, wherein higher L* values indicate a higher level of observed whiteness) of the surface of the black part, since the white cyclic oligomer bloom covers its surface. The smaller the amount of cyclic oligomer is on the surface, the more the carbon black pigment can be observed by incident light.

Observations made for the L* value on the 110° angle gave a quantitative measure of blooming that agrees well with a visual rating system. Low L* values (3-5) correspond to a low degree of blooming and higher L* values (20-25) correspond to a high degree of blooming. The observations are shown in Table 1 below:

TABLE 1

Results of the elevated-temperature aging test on PTT molded plaques.

| Example # | Temperature/ ° C. | Time/min | Average X-Rite L* Value at 110° after elevated temperature aging |
|---|---|---|---|
| 1 | 160 | 2 | 20 |
| 2 | 160 | 5 | 21 |
| 3 | 160 | 10 | 20 |
| 4 | 160 | 15 | 21 |
| 5 | 160 | 20 | 19 |
| 6 | 180 | 2 | 21 |
| 7 | 180 | 5 | 14 |
| 8 | 180 | 10 | 11 |
| 9 | 180 | 15 | 7 |
| 10 | 180 | 20 | 6 |
| 11 | 205 | 2 | 16 |
| 12 | 205 | 5 | 8 |
| 13 | 205 | 10 | 6 |
| 14 | 205 | 15 | 4 |
| 15 | 205 | 20 | 4 |
| 16 | 210 | 2 | 8 |
| 17 | 210 | 5 | 6 |
| 18 | 210 | 10 | 4 |
| 19 | 210 | 15 | 5 |
| 20 | 210 | 20 | 4 |
| 21 | 215 | 2 | 6 |
| 22 | 215 | 5 | 5 |
| 23 | 215 | 10 | 5 |
| 24 | 215 | 15 | 4 |
| 25 | 215 | 20 | 4 |

The heat-treatment of PTT molded parts reduces the amount of cyclic oligomer bloom observed during the elevated-temperature aging of those parts as indicated in Table 1. In addition to increasing the crystallinity of the PTT molded parts, the heat-treatment process removes surface cyclic oligomer by a process of sublimation as well as ring-opening polymerization. The removal of surface cyclic oligomer results in less cyclic oligomer available to bloom to the surface of the part as well as reduces the number of nucleation sites for cyclic oligomer crystal growth on the surface of the molded part. This effect can be observed in a microscopy analysis of the surface of the molded part. There are fewer crystals of cyclic oligomer in FIGS. 1B and 1C, when compared to FIG. 1A. The crystals are also larger in size. Overall, both of these effects contribute to a reduced observable bloom on the surface of a molded part.

What is claimed is:

1. A process comprising:
   heat-treating a molded article of poly(trimethylene terephthalate) by exposing the molded article to heat for a time period between about 1 minute and 1 hour,
      wherein the whiteness of the molded article, due to oligomer blooming, is decreased by at least 10 percent from the original value, based on L* values.

2. The process of claim 1, wherein the poly(trimethylene terephthalate) contains about 70 mole % or more of repeat units derived from 1,3-propane diol and terephthalic acid and/or an equivalent thereof.

3. The process of claim 1, wherein the molded article of poly(trimethylene terephthalate) is exposed to a temperature of between about 180 degrees C. and 225 degrees C., and the time periods are between about 2 minutes and 30 minutes.

4. The process of claim 1, wherein the heat is provided by convection heating, radiant heating, conduction heating, or any combination thereof.

5. The process of claim 2, wherein the poly(trimethylene terephthalate) contains up to 30 mole % of repeat units made from:
   (i) diacids comprising isophthalic acid; 1,4-cyclohexane dicarboxylic acid; 2,6-naphthalene dicarboxylic acid; 1,3-cyclohexane dicarboxylic acid; succinic acid; glutaric acid; adipic acid; sebacic acid; 1,12-dodecane dioic acid; dimethyl, diethyl, or dipropyl ester derivatives of the diacids; or mixtures thereof; and
   (ii) diols comprising ethylene glycol; 1,4-butane diol; 1,2-propanediol; diethylene glycol; triethylene glycol; 1,3-butane diol; 1,5-pentane diol; 1,6-hexane diol; 1,2-, 1,3- and 1,4-cyclohexane dimethanol; or the longer chain diols and polyols made by the reaction product of diols or polyols with alkylene oxides.

6. The process of claim 1, wherein the poly(trimethylene terephthalate) comprises up to about 5 mole % of sulfonate compounds.

7. The process of claim 6, wherein the sulfonate compounds comprise 5-lithium sulfoisophthalate, 5-sodium sulfoisophthalate, 5-potassium sulfoisophthalate, 4-sodium sulfo-2,6-naphthalenedicarboxylate, tetramethylphosphonium 3,5-dicarboxybenzene sulfonate, tetrabutylphosphonium 3,5-dicarboxybenzene sulfonate, tributyl-methyl phosphonium 3,5-dicarboxybenzene sulfonate, tetrabutylphosphonium 2,6-dicarboxynaphthalene-4-sulfonate, tetramethylphosphonium 2,6-dicarboxynapthalene-4-sulfonate, ammonium 3,5-dicarboxybenzene sulfonate, or ester derivatives thereof.

8. The process of claim 1, wherein the poly(trimethylene terephthalate) is blended with up to about 30 wt % of other polymers, based on the total weight of the poly(trimethylene terephthalate) and the other polymers.

9. The process of claim 8, wherein the other polymers comprises poly(ethylene terephthalate) (PET), poly(butylene terephthalate) (PBT), poly(ethylene) (PE), poly(styrene) (PS), nylon-6, or nylon-6,6.

* * * * *